United States Patent [19]

Kurata et al.

[11] Patent Number: 5,689,359
[45] Date of Patent: Nov. 18, 1997

[54] POLARIZATION INDEPENDENT OPTICAL ISOLATOR

[75] Inventors: Noboru Kurata, Ikoma; Masaaki Tojo, Nara-ken; Hironori Souda, Hirakata, all of Japan

[73] Assignee: Matsushita Electric Industrial Co., Ltd., Japan

[21] Appl. No.: 160,787

[22] Filed: Dec. 3, 1993

[30] Foreign Application Priority Data

Dec. 8, 1992 [JP] Japan .................. 4-327947

[51] Int. Cl.$^6$ ............... G02B 5/30; G02B 27/28; G02F 1/09
[52] U.S. Cl. ............... 359/281; 359/484; 359/487; 359/495; 359/497; 372/703; 385/34; 385/119
[58] Field of Search ............... 359/281, 282, 359/484, 487, 494, 495, 497; 385/6, 24, 27, 31, 34, 119; 372/703

[56] References Cited

U.S. PATENT DOCUMENTS

| | | | |
|---|---|---|---|
| 4,770,505 | 9/1988 | Okazaki . | |
| 4,893,890 | 1/1990 | Lutes | 350/96 |
| 5,033,830 | 7/1991 | Jameson | 350/403 |
| 5,089,786 | 2/1992 | Tamura | 359/484 |
| 5,299,056 | 3/1994 | Kurata et al. | 359/639 |
| 5,499,132 | 3/1996 | Tojo et al. | 359/484 |
| 5,574,595 | 11/1996 | Kurata et al. | 359/487 |

FOREIGN PATENT DOCUMENTS

| | | | |
|---|---|---|---|
| 0218623 | 11/1985 | Japan | 359/281 |
| 0205636 | 8/1988 | Japan | 359/484 |
| 0169423 | 7/1989 | Japan | 359/484 |
| 4-77713 | 3/1992 | Japan . | |
| 4-221922 | 8/1992 | Japan . | |
| 4-331929 | 11/1992 | Japan . | |

*Primary Examiner*—Ricky D. Shafer
*Attorney, Agent, or Firm*—Rossi & Associates

[57] ABSTRACT

A polarization independent optical isolator for transmitting a signal ray in a forward direction and suppressing backward transmission comprises: a first and second optical isolation unit for receiving, transmitting, and outputting signal rays in the forward direction and for suppress backward transmission of any rays; and a reflection unit for coupling to first and second optical isolation unit by directing the outputted signal ray from the first optical isolation unit to the second optical isolation unit, the signal ray received by the first optical isolation unit transmitting in the opposite direction to the outputted signal ray from the second optical isolation unit. A reflection protection unit may be provided to prevent undesired reflection at inlet of the optical isolator. A optical filter for reflecting a component having a predetermined wavelength and transmitting remaining component may be used for the reflection unit. An optical detector may be used for monitoring the remaining component. An absorber may be used for absorbing the remaining components. A half mirror may be used for the reflection unit for monitoring the signal ray.

24 Claims, 4 Drawing Sheets

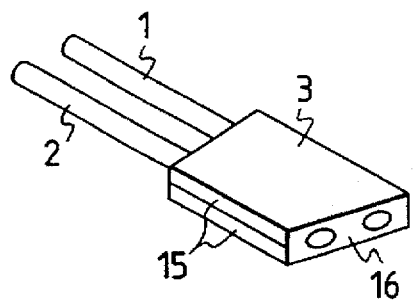
FIG. 3A
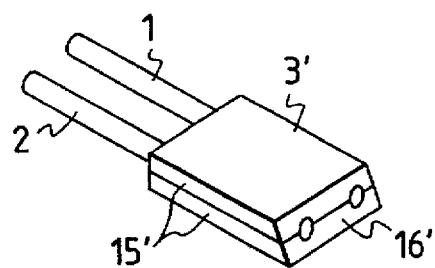
FIG. 3B
FIG. 4
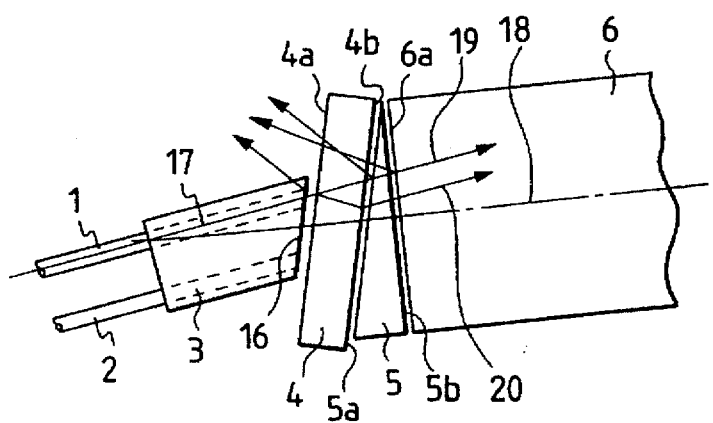
FIG. 5A
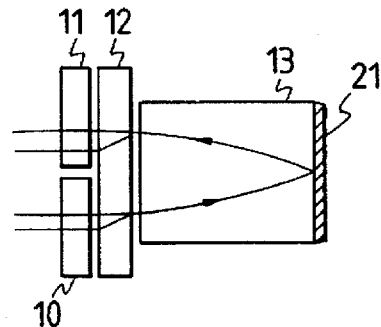
FIG. 5B
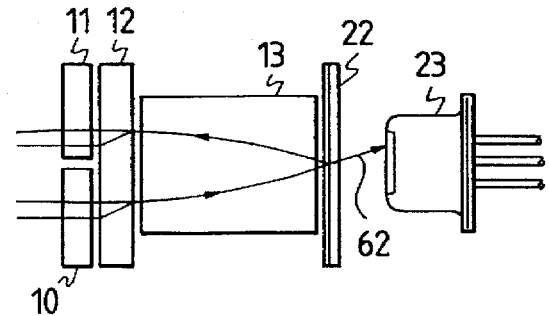

POLARIZATION INDEPENDENT OPTICAL ISOLATOR

BACKGROUND OF THE INVENTION

1. Field of the Invention

This invention relates to a polarization independent optical isolator and particularly to a reflection type of a polarization independent isolator.

2. Description of the Prior Art

Polarization independent optical isolators find a wide variety of applications in light wave communication systems. In general, isolators are utilized to prevent reflected portions of a transmitted signal from re-entering the transmitting device. Such isolators utilizes the magnetooptic effect of rotating polarized light planes unreversibly to intercept light travelling in the backward direction.

FIG. 9 is perspective view of a prior art polarization independent optical isolator which is disclosed in U.S. Pat. No. 5,033,880. A pair of stacked reciprocal rotators, namely half-wave plates 216 and 226, a Faraday rotator 218, and reflector 224 are positioned in tandem adjacent to the birefringent plate 214. In the forward (transmitting) direction, a light wave signal exiting an optical fiber is split into a pair of orthogonal rays by the birefringent plate 214. The orthogonal rays then pass through a first reciprocal rotator and the Faraday rotator for rotating polarizing light planes. The Faraday rotator 218 rotates polarizing light planes 22.5 degrees. The rotated rays are then redirected by the reflector 224 back through the Faraday rotator 218. After passing through the second reciprocal rotator, the orthogonal rays re-enter the same birefringent plate 214 where they are recombined and launched in an output fiber. Since a Faraday rotator is a non-reciprocal device, any signal traveling through the isolator in the reverse (isolation) direction will be split on both passes through the birefringent plate 214 such that neither will intercept the input fiber.

A rate of interception of backward transmitting light, namely, the isolation characteristic depends on a characteristic of a magnetooptic crystal (Faraday rotator). Therefore, the prior art polarization independent optical isolator shown in FIG. 9 has an insufficient isolation characteristic for applications to the high quality transmission systems or the optical fiber amplifiers. More specifically, there is only one stage of isolation structure because one stage of an isolation operation requires transmitting of a signal light through the birefringent plate 214 twice. Generally, one stage of isolation structure provides an isolation characteristic of about 35 dB. Therefore, the prior art polarization independent optical isolator shown in FIG. 9 has an insufficient isolation characteristic for applications to the high quality transmission systems or the optical fiber amplifiers.

SUMMARY OF THE INVENTION

The present invention has been developed in order to remove the above-described drawbacks inherent to the conventional polarization independent optical isolator.

According to the present invention there is provided a polarization independent optical isolator comprising: a first birefringent plate for separating a signal ray passing therethrough into first and second rays having first and second orthogonal polarizations wherein the ray of the first polarization experiences a first spatial displacement in a first direction as it passes through the first birefringent plate in a first transmitting direction and second spatial displacement in a second, opposite direction as it passes through the first birefringent plate in a second direction; a non-reciprocal rotating unit for rotating the first and second rays about $\pi/4+n\pi/2$ in a first rotational direction in the first transmitting direction, wherein n=0, 1, 2, ... and the first rotational direction defined by the first transmission direction; a second birefringent plate for combining the first and second rays from the non-reciprocal rotating unit to produce a combined ray wherein the ray of the first polarization experiences third spatial displacement in the second direction as it passes through the second birefringent plate in the first transmitting direction and fourth spatial displacement in the first direction as it passes through the second birefringent plate in the second transmission direction, a distance of the first spatial displacement being equal to that of the third spatial displacement; a first reciprocal rotating unit provided between the first and second birefringent plates so as to intercept the first and second rays for rotating the first and second rays about $\pi/4$ in the first rotational direction in the first transmitting direction and for rotating the rays about $\pi/4$ in a second, opposite rotational direction in the second transmitting direction; a reflection unit for redirecting the combined ray back into the second birefringent plate, the second birefringent plate separating the redirected combined ray into third and fourth rays, the non-reciprocal rotating unit for rotating the third and fourth rays about $\pi/4+n\pi/2$ in the first rotational direction in the second transmitting direction; and a second reciprocal rotating unit provided between the first and second birefringent plates so as to intercept the third and fourth rays for rotating the third and fourth rays about $\pi/4$ in the first rotational direction in the second transmitting direction and for rotating the rays about $\pi/4$ in the second rotational direction in the first transmitting direction, the first birefringent plate combining the third and fourth rays from the non-reciprocal rotating unit to produce a combined output ray.

According to the present invention there is also provided a polarization independent optical isolator comprising: a first birefringent plate for separating a signal ray passing therethrough into first and second rays having first and second orthogonal polarizations wherein the ray of the first polarization experiences a first spatial displacement in a first direction as it passes through the first birefringent plate in a first transmitting direction and second spatial displacement in a second, opposite direction as it passes through the first birefringent plate in a second direction; a non-reciprocal rotating unit for rotating the first and second rays about $\pi/4+n\pi/2$ in a first rotational direction in the first transmitting direction, wherein n=0, 1, 2, ... and the first rotational direction defined by the first transmission direction; a second birefringent plate for combining the first and second rays from the non-reciprocal rotating unit to produce a combined ray wherein the ray of the first polarization experiences third spatial displacement in the second direction as it passes through the second birefringent plate in the first transmitting direction, a first distance of the first spatial displacement being equal to that of the third spatial displacement; a reflection unit for reflecting the combined ray, the second birefringent plate separating the reflected combined ray passing therethrough into third and fourth rays having the first and second orthogonal polarizations wherein the ray of the first polarization experiences a fourth spatial displacement in the first direction as it passes through the second birefringent plate in a second transmitting direction, the non-reciprocal rotating unit rotating the third and fourth rays about $\pi/4+n\pi/2$ in the first rotational direction in the second transmitting direction; and a third birefringent plate for combining the third and fourth rays from the non-reciprocal rotating unit to produce a combined output ray wherein the ray of the first polarization experiences fifth spatial displacement in the first direction as it passes through the third birefringent plate in the second transmitting direction and sixth spatial displacement in the second direction as it passes through the third birefringent plate in the first transmission direction, a second distance of the fourth spatial displacement being equal to that of the fifth spatial displacement.

According to the present invention there is further provided a polarization independent optical isolator for transmitting a signal ray in a forward direction and suppressing backward transmission comprising: a first and second optical isolation unit for receiving, transmitting, and outputting signal rays in the forward direction and for suppress backward transmission of any rays; and a reflection unit for coupling to first and second optical isolation unit by directing the outputted signal ray from the first optical isolation unit to the second optical isolation unit, the signal ray received by the first optical isolation unit transmitting in the opposite direction to the outputted signal ray from the second optical isolation unit. A reflection protection unit may be provided to prevent undesired reflection at inlet of the optical isolator. An optical filter for reflecting a component having a predetermined wavelength and transmitting remaining component may be used for the reflection unit. An optical detector may be used for monitoring the remaining component. An absorber may be used for absorbing the remaining components. A half mirror may be used for the reflection unit for monitoring the signal ray.

BRIEF DESCRIPTION OF THE DRAWINGS

The object and features of the present invention will become more readily apparent from the following detailed description taken in conjunction with the accompanying drawings in which:

FIG. 3A is a perspective view of the optical fiber array of the first embodiment shown in FIGS. 1 and 2;

FIG. 3B is a perspective view of a modified optical fiber array of the first embodiment;

FIG. 4 is a partial enlarged view of the optical isolator of the first embodiment for showing a structure for preventing a returning ray;

FIG. 5A is a partial side view of a reflection portion of a first modification of the first embodiment;

FIG. 5B is a partial side view of a reflection portion of a second modification of the first embodiment;

The same or corresponding elements or parts are designated as like references throughout the drawings.

DETAILED DESCRIPTION OF THE INVENTION

Hereinbelow will be described a first embodiment of this invention.

Figure 1:
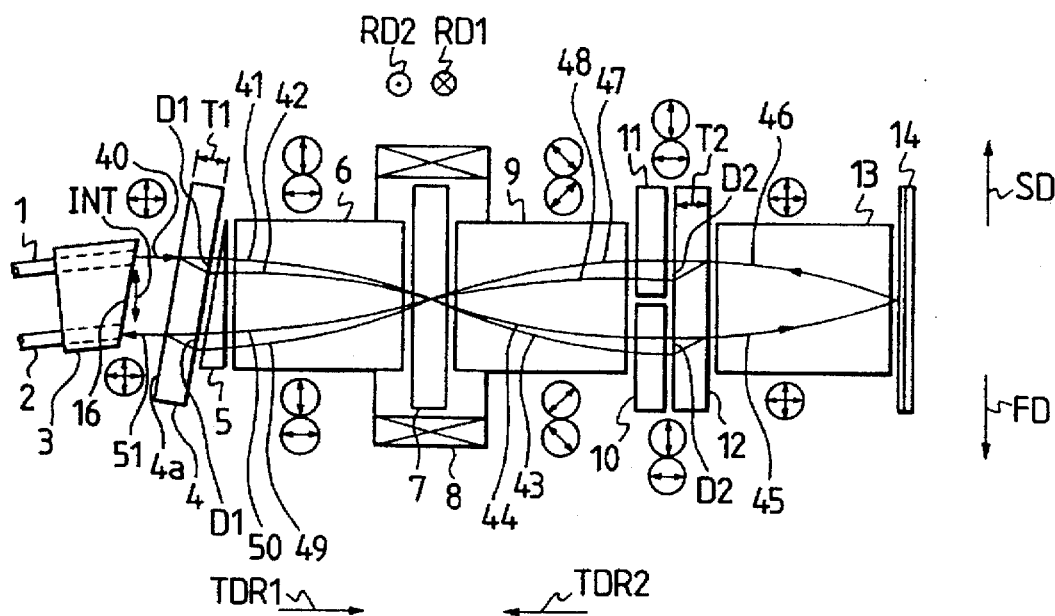
FIGS. 1 and 2 are side views for showing a structure of a first embodiment of polarization independent optical isolator with forward ray ways and backward ray ways indicated respectively.
Figure 2:
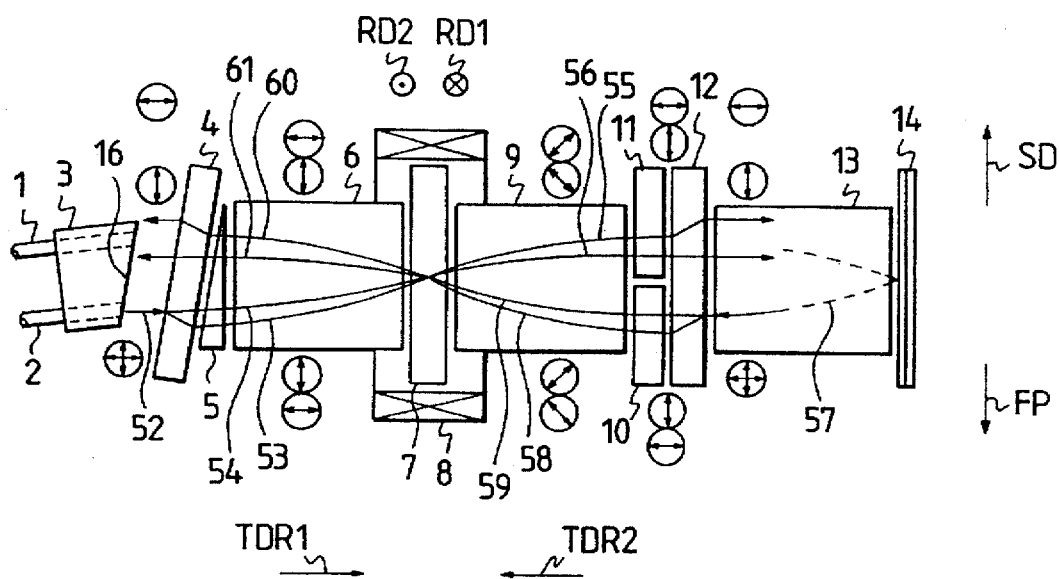

FIGS. 1 and 2 are side views for showing a structure of the first embodiment of polarization independent optical isolator with forward ray loci and backward ray loci indicated respectively.

In FIG. 1, numerals 1 and 2 are single mode optical fibers, numeral 3 is an optical fiber array for arranging tips of the optical fibers 1 and 2 in parallel and directing their optical axes in the predetermined direction, the tips of the optical fibers 1 and 2 having input/output facets inclined about 8 degrees to a normal plane of the optical axis of optical fibers 1 and 2. Numeral 4 is a light polarizing dividing portion for dividing incident light into orthogonal rays, that is, two linearly polarized rays having an orthogonal relation in their polarization planes. The light polarizing dividing portion 4 comprises a birefringent crystal (plate), such as a Rutile crystal. Numeral 6 is a Grin rodlens for converting incident light thereto into collimated light at an exiting plane thereof. Numeral 5 is a triangle prism having an acute angle of an apex angle sandwiched between the birefringent plate 4 and the Grin rodlens 6 with its surfaces contacting with surfaces of the birefringent plate 4 and the Grin rodlens 6.

Numeral 7 is a magnetooptic crystal (Faraday rotator or non-reciprocal rotator) provided inside a removable cylindrical magnet 8. The magnetooptic crystal 7 unreversibly rotates polarized light planes counterclockwise about 45 degrees ($\pi/4+n\pi/2$, $n=0, 1, 2 \ldots$) in response to a magnetic field of the magnet 8. Numeral 9 is a Grin rodlens for focusing collimated light incident thereto around an exiting facet thereof. Numeral 10 is a rotational crystal comprising a half-wave plate for reversibly (reciprocally) rotating polarized light planes of light incident thereto counterclockwise about 45 degrees. Numeral 11 is a rotational crystal comprising a half-wave plate 11 for reversibly rotating polarized light planes of light incident thereto clockwise about 45 degrees.

Numeral 12 is a polarized light coupler for recombining two orthogonal rays in the same optical axes. The polarized light coupler 12 comprises a birefringent plate, such as the Rutile crystal. Numeral 13 is a Grin rodlens for converting light incident thereto into a collimated light at an exiting surface thereof. Each of the Grin rodlenses 6, 9 and 13 has a larger numerical aperture than the optical fibers 1 and 2.

Therefore, light exiting an optical fibers 1 and 2 are coupled to Grin rodlenses 6, 9, and 13 with a low insertion loss. Numeral 14 is a mirror for reflecting almost all incident light thereto forming a reflection means together with the Grin rodlens 13 for returning transmitting light through the birefringent plate 12. Numerals 40 to 61 are arrows for schematically showing loci of transmitting light in an optical plane.

In the drawings, light travels in the horizontal direction of the drawings and the polarizing directions are shown by the directions of the arrows as shown and are represented in a left side view on a normal plane of the optical axis of the optical isolator.

Operation of the first embodiment will be described.

FIG. 1 shows light loci in the forward transmitting condition. Non-polarized light 40 exiting the optical fiber 1 is incident to the birefringent crystal 4 dividing the non-polarized light 40 into a linearly polarized ordinary ray 41 and a linearly polarized extraordinary ray 42 having an orthogonal relation therebetween. Therefore, the ordinary ray transmits straight through the birefringent crystal 4. On the other hand, a ray way of the extraordinary ray 42 is bent, so that it exits from the birefringent crystal 4 at a place on an exiting surface different from the ordinary ray. A separation distance D1 between an exiting point of the ray 41 from the birefringent crystal 4 and that of the ray 42 is determined by the kind of the birefringent crystal 4 and a thickness T1 of the birefringent crystal 4.

The linearly polarized rays 41 and 42 are incident to the Grin rodlens 6 at places slightly deviated from the optical axis of the Grin rodlens 6 after transmission through the triangle prism 5. The incident rays 41 and 42 to the Grin rodlens 6 are converted into approximately collimated rays at the exiting plane of the Grin rodlens 6. The exiting rays 41 and 42 from the Grin rodlens 6 are incident to the magnetooptic crystal 7. The magnetooptic crystal 7 rotates polarized light planes of light incident thereto about 45 degrees counterclockwise non-reciprocally in response to the magnetic field of the cylindrical magnet 8. Therefore, rays 41 and 42 incident to the magnetooptic crystal 7 are converted into linearly polarized rays 43 and 44 subjected to counterclockwise rotation of polarized planes about 45 degrees. The magnetooptic crystal 7 rotates the polarized rays 41 and 42 π/4 counterclockwise, a first rotational direction RD1 (a depth direction in the drawing) in the first transmission direction TDR1 (rightward in the drawing) and rotates the polarized rays π/4 counterclockwise also, the first rotational direction RD1 in the second transmission direction TDR2 (leftward in the drawing).

The rays 43 and 44 exiting the magnetooptic crystal 7 enter the Grin rodlens 9. The ray 41 transmits through the Grin rodlens 6 on a upper ray locus (in the drawing) against the ray 42 but the ray 43 derived from the ray 41 transmits through the Grin rodlens 9 on a lower ray locus (in the drawing) against the ray 44. The Grin rodlens 9 focuses the rays 43 and 44 at two places slightly deviated from the optical axis thereof around an exiting plane of the Grin rodlens 9 such that these two places are point-symmetrical with respect to the center of the magnetooptic crystal 7.

The linearly polarized rays 43 and 44 exiting the Grin rodlens 9 transmit the half-wave plate 10, so that polarized planes of the rays 43 and 44 are subjected counterclockwise rotation of about 45 degrees i.e. are rotated in the first rotation direction RD1. Therefore, rays exiting the half-wave plate 10 have polarized planes different from the rays 41 and 42 by 90 degrees respectively and enter the birefringent crystal 12. The birefringent crystal 12 has the same distance D2 for dividing the ordinary ray and the extraordinary ray as the distance D1 of the birefringent crystal 4 and is arranged to have the dividing of the extraordinary ray in a vertical direction opposite to that of the birefringent crystal 4. That is, spatial displacement of the extraordinary ray passing through the birefringent crystal 12 against an ordinary ray is in the first direction FD.

Therefore, a ray locus of the liner polarized ray 43 is bent because of the linear polarized ray 43 is an extraordinary ray such that the linear polarized ray 43 is re-combined with the linear polarized ray 44. The rays re-combined transmits along the same ray way as a combined ray 45. The structure mentioned above forms a first stage of the optical isolator. Here, the kind of the birefringent crystal 4 is the same as the birefringent crystal 12 and thickness T1 of the birefringent crystal 4 is the same as the birefringent crystal 12 because the same spatial displacements D1 and D2 are provided.

Then, the combined ray 45 enters the Grin rodlens 13 which converts the combined ray 45 into an approximately collimated combined ray 45 at the exiting plane. The collimated combined ray 45 is reflected at the reflector 14. The reflected ray 46 enters the Grin rodlens 13 again. The Grin rodlens 13 focuses the reflected ray on an end facet adjacent to the birefringent crystal 12 at a place which is symmetrical to the firstly entering place of the Grin rodlens 13 with respect to the optical axis of the Grin rodlens 13.

The reflected ray 46 is divided into linear polarized orthogonal rays 47 and 48 by the birefringent crystal 12 in accordance with direction of polarized planes wherein the ray of an extraordinary ray is subjected spatial displacement in the first direction. Orthogonal rays 47 and 48 transmit through the half-wave plate 11 which further rotates polarized planes of orthogonal rays 47 and 48 counterclockwise about 45 degrees respectively, i.e., in the first rotational direction RD1, and then, enter the Grin rodlens 9. Here, the half-wave plate 11 rotates light incident thereto from the right (in the drawing) counterclockwise (RD1) about 45 degrees because it rotates the polarized plane of light incident thereto from the left (in the drawing) clockwise (RD2 which is opposite to RD1) about 45 degrees.

The magnetooptic crystal 7 rotates polarized planes of rays incident thereto counterclockwise about 45 degrees irrespective of the incident direction of light, so that the linearly polarized rays 47 and 48 transmits the magnetooptic crystal 7 and their polarized planes are further rotated counterclockwise (RD1) about 45 degrees. Therefore, polarized directions of the linearly polarized rays 49 and 50 are different from the linearly polarized rays transmitted through the birefringent crystal 12 by 90 degrees respectively.

The ray 47 transmits through the Grin rodlens 9 on a upper ray way (in the drawing) against the ray 48 but the ray 49 derived from the ray 47 transmits through the Grin rodlens 6 on a lower ray locus (in the drawing) against the ray 50. The Grin rodlens 6 focuses the the rays 49 and 50 at two places slightly deviated from the optical axis thereof around an exiting plane of the Grin rodlens 6 such that these two places and incident points of the ray 48 and 47 of the Grin rodlens 9 are point-symmetrical with respect to the center of the magnetooptic crystal 7.

The ray 49 and 50 are incident to the birefringent crystal 4 after transmitting through the triangle prism 5. The linearly polarized ray 49 is incident to the birefringent crystal 4 as an extraordinary ray, so that the ray 49 is bent upwardly (in the drawing) and are recombined with the linear ray 50 on the same optical axis as a recombined ray 51. The recombined ray 51 is incident to the optical fiber 2 fixed to the optical fiber array 3 with a low insertion loss. The above-mentioned structure forms the second optical isolator.

Operation of the first embodiment when light enters in the opposite direction will be described with reference to FIG. 2.

FIG. 2 shows light loci in the backward transmitting condition. Non-polarized light 52 exiting the optical fiber 2 is incident to the birefringent crystal 4 for dividing the non-polarized light 40 into a linearly polarized ordinary ray 54 and a linearly polarized extraordinary ray 53 having an orthogonal relation therebetween. Therefore, the ordinary ray 54 transmits straight. On the other hand, a ray locus of the extraordinary ray 53 is bent, so that it exits from the birefringent crystal 4 at a place on an exiting surface different from the ordinary ray 54.

The linearly polarized rays 53 and 54 are incident to the Grin rodlens 6 at a places slightly deviated from the optical axis of the Grin rodlens 6 after transmission through the triangle prism 5. The incident rays 53 and 54 to the Grin rodlens 6 are converted into approximately collimated rays at the exiting plane of the Grin rodlens 6. The exiting rays 53 and 54 from the Grin rodlens 6 are incident to the magnetooptic crystal 7. The magnetooptic crystal 7 rotates polarized light planes of light incident thereto counterclockwise (RD1) about 45 degrees non-reciprocally in response to the magnetic field of the cylindrical magnet 8. Therefore, rays 53 and 54 incident to the magnetooptic crystal 7 are converted into linearly polarized rays 56 and 55 subjected to counterclockwise rotation of polarized planes of about 45 degrees. The rays 55 and 56 exiting the magnetooptic crystal 7 enter the Grin rodlens 9. The ray 54 transmits through the Grin rodlens 6 on a upper ray locus (in the drawing) against the ray 53 but the ray 56 derived from the ray 54 transmits through the Grin rodlens 9 on a lower ray locus (in the drawing) against the ray 55. The Grin rodlens 9 focuses the rays 55 and 56 at two places slightly deviated from the optical axis thereof around an exiting plane of the Grin rodlens 9 such that these two places and incident points at the Grin rodlens 6 are point-symmetrical with respect to the center of the magnetooptic crystal 7.

The linearly polarized rays 55 and 56 exiting the Grin rodlens 9 transmit the half-wave plate 11, so that polarized planes of the rays 55 and 56 are subjected clockwise rotation (RD2) about 45 degrees. Therefore, rays exiting the half-wave plate 11 have the same polarized planes as the rays 53 and 54 respectively and enter the birefringent crystal 12. Here, the the polarized planes of the exiting half-wave plate 11 are different from the case shown in FIG. 1. Therefore, a ray locus of the liner polarized ray 55 is bent in the second direction SD because of the linearly polarized ray 55 is an extraordinary ray such that the linearly polarized ray 43 is not re-combined with the linearly polarized ray 56. On the other hand, the linearly polarized ray 56 transmits through the half-wave plate 11 without bending because the linearly polarized ray 56 is ordinal ray for the birefringent crystal 12. Therefore, the linearly polarized rays 55 and 56 do not enter the optic fiber 1 basically.

Since one stage of the optical isolator mentioned above has an isolation characteristic of about 35 dB, so that it cannot provide a sufficient isolation characteristic. That is, there may be still a weak ray 57 transmitting in the backward direction.

The non-polarized ray 57 enters the birefringent crystal 12 which divides the ray 57 into two linearly polarized rays 58 and 59 having an orthogonal relation therebetween, that is, into the linearly polarized orthogonal rays 58 and 59. Linear polarized rays 58 and 59 transmit through the half-wave plate 10 which rotates polarized planes of orthogonal rays 58 and 59 clockwise (RD2) about 45 degrees respectively and then, enter the Grin rodlens 9. After transmission through the Grin rodlens 9, the linearly polarized rays 58 and 59 enter the magnetooptic crystal 7.

The magnetooptic crystal 7 rotates polarized planes of rays incident thereto counterclockwise (RD1) about 45 degrees irrespective of the incident direction of light, so that the linearly polarized rays 58 and 59 are converted into linearly polarized rays 60 and 61.

The linearly polarized rays 60 and 61 have the same polarized directions as the linearly polarized rays just after separation by the birefringent crystal 12 respectively and are different from the case of the forward transmission shown in FIG. 1 where there is a difference of 90 degrees respectively. Therefore, the linearly polarized ray 60 incident to the birefringent crystal 4 after transmission of the Grin rodlens 6 is bent as an extraordinary ray in the second direction SD. On the other hand, the linearly polarized ray 61 transmits straight as an ordinary ray. Accordingly, the linearly polarized rays 60 and 61 are not recombined on the same optical axis and show optical loci different from the case of the forward transmission locus 40 shown in FIG. 1.

Here, an interval INT between the optical fibers 1 and 2 is set to be larger than the separation distances D1 and D2 of the extraordinary ray of the birefringent crystals 4 and 12. Therefore, the non-polarized ray 57 cannot enter the optical fiber 1.

As mentioned above, the optical isolator of the first embodiment transmits the forward ray 40 emitted from the optical fiber 1 to the optical fiber 2 with a low insertion loss and suppresses the reverse rays 52 and 57 emitted from the optical fiber 2 by two stages of the isolating operations to prevent the reverse rays 52 and 57 from entering the optical fiber 1. Therefore, the optical isolator of the first embodiment functions as two stages of the polarization independent optical isolator of the reflection type.

As mentioned above, the structure of this embodiment has features as follows:

Two optical fibers 1 and 2, the birefringent crystal 4, the grin rodlens 6, the magnetooptic crystal 7 for rotating a polarized incident ray thereto about 45 degrees, the Grin rodlens 9, the birefringent crystal 12, a reflection means having the grin rodlens 13 and the mirror 14 are arranged in order mentioned. Moreover, the half-wave plates 10 and 11 are provided between the Grin rodlens 9 and the birefringent crystal 12 at respective positions corresponding to the optical fibers 1 and 2, each of half-wave plates 10 and 11 rotating polarized planes in the opposite directions about 45 degrees. Further, the birefringent crystals 4 and 12 have the same separation distances D1 and D2 between the ordinal ray and the extraordinary ray and are arranged to have optical axes thereof in the opposite direction to provide the separation directions of the extraordinary rays in the opposite directions. Moreover, the interval between the optical fibers 1 and 2 are set to be larger than the separation distances of the birefringent crystals 4 and 12.

According to the above-mentioned structure, two stages of the optical isolator is provided, so that the number of the parts of the optical isolator is reduced because most of all parts are common between these two stages of the optical isolators. In other words, the polarization independent optical isolator having a higher isolation characteristic can be provided with a low cost and with a small size.

Moreover, the optical fibers 1 and 2 are mounted on one side of the optical isolator having two stages of isolation structure, so that the arrangement of the optical fibers 1 and 2 is easy on assembling and a space necessary for the optical fibers 1 and 2 can be reduced.

Further, the magnet 8 can be removed from the side of the reflector 14 because two optical fibers 1 and 2 are mounted on the one side of the optical isolator. Therefore, the magnetic field applied to the magnetooptic crystal 7 can be inverted by changing the magnet 8 to another magnet, so that this optical isolator intercepts the incident ray from the optical fiber 1 and transmits the incident ray from the optical fiber 2. That is, the inside of the magnet 8 has a larger dimension than any portions of the optical isolator of this invention in the radial direction with respect to the optical axis of the optical isolator.

In the above-mentioned embodiment, the half-wave plates 10 and 11 are provided between the Grin rodlens 9 and the birefringent crystal 12. However, it is possible that the half-wave plates 10 and 11 are provided between the birefringent crystal 4 and the Grin rodlens 6 with the similar isolation characteristic.

FIG. 3A is a perspective view of the optical fiber array (holder) 3 of the first embodiment shown in FIGS. 1 and 2. The optical fibers 1 and 2 are arranged in parallel and are united with array members 15. Therefore, end facets of the optical fibers 1 and 2 can be polished together. Moreover, these optical fibers 1 and 2 can be assembled with the birefringent crystal 4 at a time. Further, the facet 16 of the optical fiber array 3 are polished to be inclined about eight degrees with respect to a normal plane of the optical axes of the optical fibers 1 and 2. Therefore, the inclined facet 16 is so arranged as to contact with a first surface 4a of the birefringent crystal 4 to prevent reflection light developed at the facet of the birefringent crystal 4 from returning to the optical fibers 1 and 2. FIG. 3B is a perspective view of a modified optical fiber array 3' of the first embodiment. The optical fibers 1 and 2 are arranged in parallel and are united with array members 15'. Therefore, end facets of the optical fibers 1 and 2 can be polished together. The facet 16' is inclined also but is inclined to the normal plane of the optical axis of the optical isolator of this invention in the different direction from the optical fiber array 3. The facet 16 or 16' of the optical fiber array may be inclined to the normal plane of the axis of the optical isolator in any direction to prevent reflection light therefrom from entering the birefringent plate 4 again.

FIG. 4 is a partial enlarged view of the optical isolator of the first embodiment for showing a structure of preventing the returning of rays at the optical fiber coupling portion. The birefringent crystal 4 contacts with the inclined facet 16. An optical axis 17 of the optical fiber array 3 is arranged to have an inclined angle of several degrees to a center axis 18 of the Grin rod lens 6. This structure prevents reflection light developed at respective interfaces through which the ray emitted from the optical fiber 2 transmits from returning to the optical fiber 1 or 2.

Moreover, the triangle prism 5 is provided with first and second side surfaces 5a and 5b contacting with a second surface 4b of the birefringent crystal 4 and a surface 6a of the Grin rodlens 6. This provides a surer mounting of the birefringent crystal 4 and a refraction ratio matching between the birefringent crystal 4 and the Grin rodlens 6. Therefore, a considerable large attenuation characteristic of reflection light can be provided.

The birefringent crystal 4 is arranged to have the inclined angle to the optical axis 17. However, the birefringent crystal 4 is inclined to the optical axis within a plane including the ordinary ray 19 and the extraordinary ray 20, so that an adversary effect on the birefringent characteristic due to the inclined structure can be minimized.

In the first embodiment shown in FIGS. 1 and 2 has the mirror 14 as the reflection means. On the other hand, FIG. 5A shows a modification of the first embodiment and is a partial side view of a reflection portion. A dielectric film 21 is deposited on one end surface of the Grin rodlens 13. This provides a simple structure of the reflection means.

FIG. 5B shows a second modification of the first embodiment and is a partial side view of a modified reflection portion. A half mirror 22 for reflecting a part of incident light thereto and for transmitting a remaining portion of the light, i.e., a remaining ray 62, is provided in place of the reflector 14. A photodetector 23 is provided behind the half mirror 22 for detecting the remaining portion 62 of light. Therefore, the remaining ray 62 can be provided and can be monitored.

Figure 6:
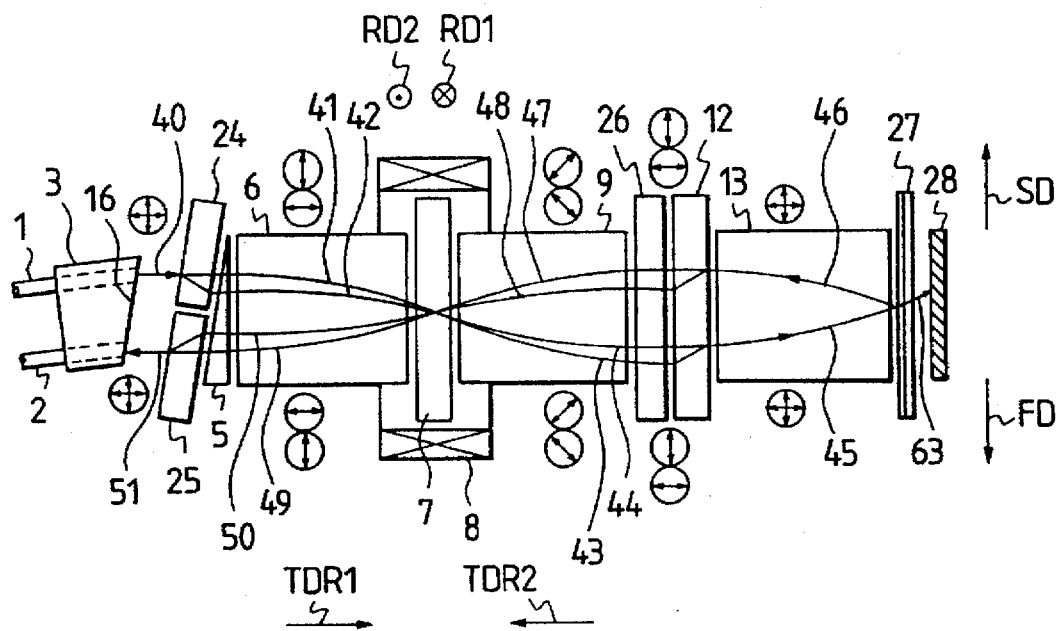
FIGS. 6 and 7 are side views for showing a structure of a second embodiment of a polarization independent optical isolator with forward ray loci and backward ray loci indicated respectively.
Figure 7:
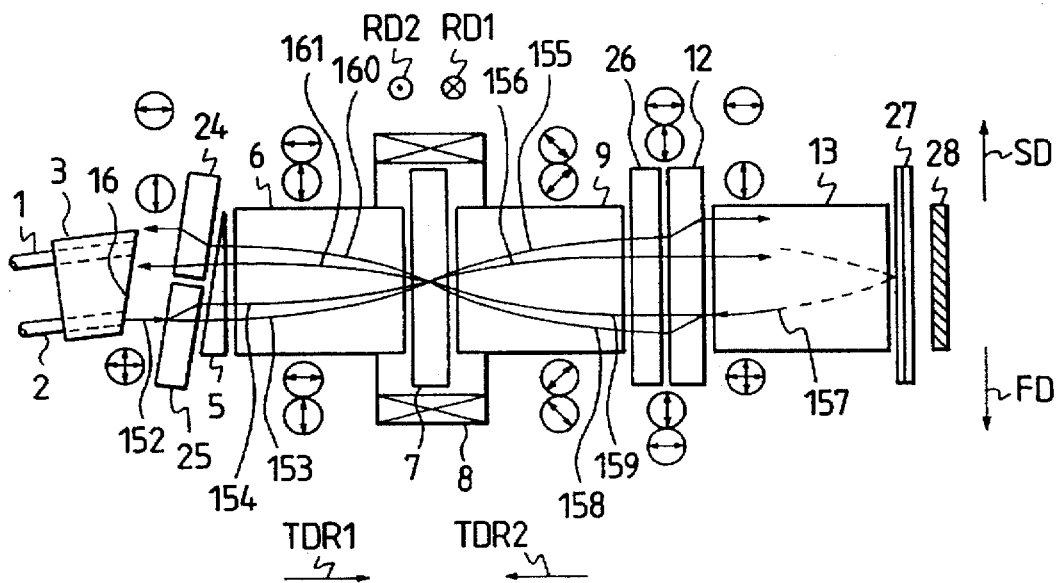

FIGS. 6 and 7 are side views of a second embodiment of an optical isolator of this invention. FIG. 6 shows light loci of forward transmission. FIG. 7 shows light loci of backward transmission.

The basic structure of the second embodiment is the same as the first embodiment. A difference of the second embodiment from the first embodiment is as follows:

The birefringent crystal 4 is replaced with a birefringent crystals 24 and 25, such as a rutile crystal, for separating incident light into two linearly polarized rays having an orthogonal relation therebetween. The half-wave plates 10 and 11 of the first embodiment is replaced with a half-wave plate 26. In place of the mirror 14, an optical filter (reflector) 27 for reflecting light having a predetermined wavelength and for transmitting other wavelength light is provided. A light absorber 28 is provided adjacent to the optical filter 27 to receive and absorb light transmitted through the optical filter 27. Light absorber 28 can be replaced with a photodetector 23 similar to that shown in FIG.5B and further discussed herein with respect to the first embodiment.

The birefringent crystals 12, 24, and 25 have the same separation distance between the ordinary ray and the extraordinary ray. The birefringent crystal 24 is so arranged that an optical axis thereof is opposite to that of the birefringent crystal 25 in order that the extraordinary ray is separated in the opposite direction as shown in FIG. 6. A half-wave plate 26 reversibly rotates a polarized plane of an incident light counterclockwise about 45°. The Grin rodlens 13, the optical filter, the light absorber 28 forms a reflection means.

The facet 16 of the optical fiber array 3 is polished to have an inclined angle. Facets of the optical fibers 1 and 2 are arranged to contact with respective surfaces of the birefringent crystals 24 and 25. The optical axis of the optical fiber array 3 is inclined to the center axis of the Grin rodlens 6. The birefringent crystals 24 and 25 are inclined within a plane including the ordinary and extraordinary rays separated to reduce an adversary effect of birefringent effect in the case of the inclined entrance of light. The same or corresponding elements or parts to the first embodiment are designated as like references and thus, a detailed description is omitted.

As mentioned above, the difference of this second embodiment from the first embodiment is that: in place of the birefringent crystal 4, the birefringent crystals 24 and 25 having opposite optical axes each other are respectively provided at positions through which light emitted from the optical fibers 1 and 2; in place of the half-wave plates 10 and 11, the single half-wave plate 26 are provided; in place of the reflector 14, the optical filter 27 for reflecting light having the predetermined wavelength and for transmitting the remaining ray; and the optical absorber 28 for absorbing the remaining ray from the optical filter 28.

Operation of the forward transmission of the second embodiment well be described with reference to FIG. 6. However, the optical fiber array 3, the triangle prism 5, the magnet 8, the Grin rodlenses 6, 9, and 13 are common to the first embodiment. Therefore, a detailed description is omitted.

A non-polarized ray 40 emitted from the optical fiber 1 is separated by the birefringent crystal 24 into two linearly polarized rays 41 and 42 having an orthogonal relation therebetween. The linearly polarized first and second rays 41, 42 are incident to the magnetooptic crystal 7.

The magnetooptic crystal 7 rotates polarized planes of the linearly polarized rays 41 and 42 counterclockwise (RD1) 45 degrees to produce linearly polarized rays 43 and 44. The linearly polarized rays 43 and 44 transmit through the Grin rodlens 9 and the half-wave plate 26. The half-wave plate 26 further rotates polarized planes of the linearly polarized rays 43 and 44 counterclockwise (RD1) 45 degrees. That is, the linearly polarized rays after transmission of the half-wave plate 26 have the polarized planes which is different from the linearly polarized rays 41 and 42 by 90 degrees. Therefore, the linearly polarized ray 43 converted from the ray 41 whose light locus was not bent as an ordinary ray is bent by the birefringent crystal 12. On the other hand, the linearly polarized ray 44 derived from the ray 42 whose light locus was bent as an extraordinary ray transmits straight through the birefringent crystal 12. Therefore, linearly polarized rays 43 and 44 are recombined and thus, converted into a combined ray 45. The above-mentioned structure forms a first stage of optical isolator of the second embodiment.

The combined ray 45 transmits through the Grin rodlens 13 and is reflected at the optical filter 27. The reflected ray 46 enters the birefringent crystal 12 again.

The optical filter 27 reflects a ray having a predetermined wavelength and transmits the remaining light therethrough. Therefore, the optical filter 27 removes unnecessary ray 63 by transmitting therethrough. The unnecessary ray 63 is absorbed by the absorbing member 28.

The reflected ray 46 is separated into two linearly polarized third and fourth rays 48, 47 by the birefringent crystal 12. Then, polarized planes of the linearly polarized rays 47 and 48 are rotated clockwise (RD2) about 45 degrees by the half-wave plate 26. The linearly polarized rays 47 and 48 transmit through the Grin rodlens 9 and enter the magnetooptic crystal 7. The magnetooptic crystal 7 rotates the polarized planes of the linearly polarized rays 47 and 48 counterclockwise (RD1) about 45 degrees. Therefore, the linearly polarized rays 47 and 48 are converted into linearly polarized rays 49 and 50. The linearly polarized rays 49 and 50 have polarized planes having directions which is the same as the linearly polarized rays between the birefringent crystal 12 and the half-wave plate 26.

The birefringent crystal 25 is arranged to have the optical axis thereof in the opposite direction to the birefringent crystal 24 to obtain the separation of an extraordinary ray in the opposite direction to the birefringent crystal 24. Therefore, the linearly polarized ray 50 which was bent as an extraordinary ray by the birefringent crystal 12 is bent in the first direction FD. On the other hand, the linearly polarized ray 49 transmits straight through the birefringent crystal 25. Accordingly the linearly polarized rays 49 and 50 are combined as a combined ray 51. The combined ray 51 enters the optical fiber 2 with a low insertion loss. The above-mentioned structure forms a second optical isolator of the second embodiment.

Operation of the second embodiment in the backward transmission will be described.

A non-polarized ray 152 emitted at the optical fiber 2 enters the birefringent crystal 25. The birefringent crystal 25 separates the non-polarized ray 152 into linearly polarized rays 153 and 154 having an orthogonal relation therebetween. The linearly polarized rays 153 and 154 are converted into linearly polarized rays 155 and 156 whose polarized planes are rotated counterclockwise about 45 degrees by the magnetooptic crystal 7 after transmission through the Grin rod lens 6. Then, the linearly polarized rays 155 and 156 are further rotated counterclockwise about 45 degrees by the half-wave plate 26 after transmission through the Grin rodlens 9.

The linearly polarized rays 155 and 156 incident to the birefringent crystal 12 have polarized planes different from the linearly polarized rays 53 and 54 by about 90 degrees. Therefore, the linearly polarized ray 156 transmits straight as an ordinary ray but the linearly polarized ray 155 bent as an extraordinary ray. Those light locus are different from the case of the forward transmission as shown in FIG. 6.

Therefore, the non-polarized ray 152 emitted by the optical fiber 2 cannot enter the optical fiber 1.

Operation of the second embodiment in the backward transmission will be described.

A ray 157 which was not intercept by the above-mentioned firsts stage of the optical isolator of the second embodiment and reflected by the optical filter 27 is separated into two linearly polarized rays 158 and 159 by the birefringent crystal 12 and enters the half-wave plate 26. The half-wave plate 26 rotates polarized planes of the linearly polarized rays 158 and 159 clockwise about 45 degrees respectively. The magnetooptic crystal 7 rotates the polarized planes counterclockwise about 45 degrees after transmission through the Grin rodlens 9. Therefore, linearly polarized rays 160 and 161 are obtained. Directions of the linearly polarized rays 160 and 161 are the same as the linearly polarized rays separated by the birefringent crystal 12. Therefore, the linearly polarized ray 61 transmits the birefringent crystal 24 straight as an ordinary ray but the linearly polarized ray 160 is bent as an extraordinary ray. That is, the linearly polarized rays 160 and 161 transmit through the birefringent crystal 27 in the different manner of the forward transmitting, so that the non-polarized ray 157 cannot enter the optical fiber 1.

As mentioned above, the optical isolator of the second embodiment transmits a light signal from the optical fiber 1 to the optical fiber 2 and prevents the ray from the optical fiber 2 from entering the optical fiber 1 through two stages of optical isolation structures.

In the second embodiment, birefringent crystals 24 and 25 are arranged to have optical axes in opposite directions therebetween at respective positions through which rays emitted from the optical fibers 1 and 2. Moreover, a single half-wave plate 26 which commonly used for the first and second stages is provided. The birefringent crystals 12, 24, and 25 have the same separation distance between the ordinary ray and the extraordinary ray and an interval of the optical fibers 1 and 2 is set to be larger than the separation distance. The birefringent crystals 24 and 25 are arranged to have optical axes in opposite directions therebetween.

This structure provides a small size configuration and a favorable isolation characteristic with the number of parts reduced at a low cost because there are two stages of optical isolation operations. Moreover, the reflection means of this embodiment is formed by the Grin rodlens 13, optical filter 27, and the absorbing member 28. This structure can remove the unnecessary ray and absorbs the unnecessary ray.

Figure 8:
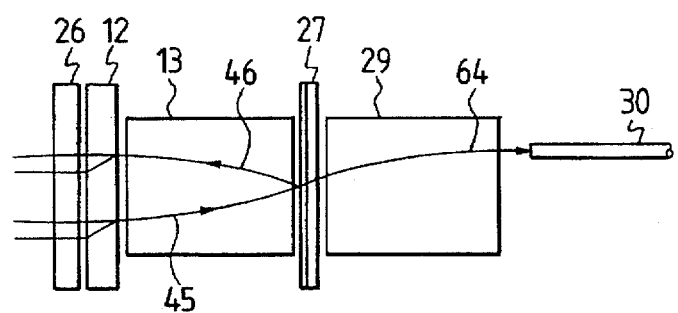
FIG. 8 is a partial side view for showing a modification of the second embodiment.

FIG. 8 is a partial side view for showing a modified embodiment of the second embodiment. In place of the absorbing member 28, a Grin rodlens 29 is provided for receiving the remaining ray 64 from the optical filter 27 and an optical fiber 30 is provided for receiving the remaining ray 64 from the Grin rodlens 29.

The rodlens 29 receives and transmits the remaining ray from the optical filter 27 toward the optical fiber 30. The optical fiber 30 receives the remaining ray 64 from the Grin rodlens 29, This structure provides an optical separation in accordance with the predetermined wavelength of the optical filter 27. The position of the optical fiber 30 is set to receive the remaining ray 64 coming from the optical fiber 1. However, it is possible to receive the ray coming from the optical fiber 2 having a wavelength other than the predetermined wavelength by selection of the position of the optical fiber 30.

In the second embodiment, the half-wave plate 26 is provided between the Grin rodlens 9 and the birefringent crystal 12. However, the half-wave plate 26 can be provided between the Grin rodlens 6 and the birefringent crystals 24 and 25.

Figure 9:
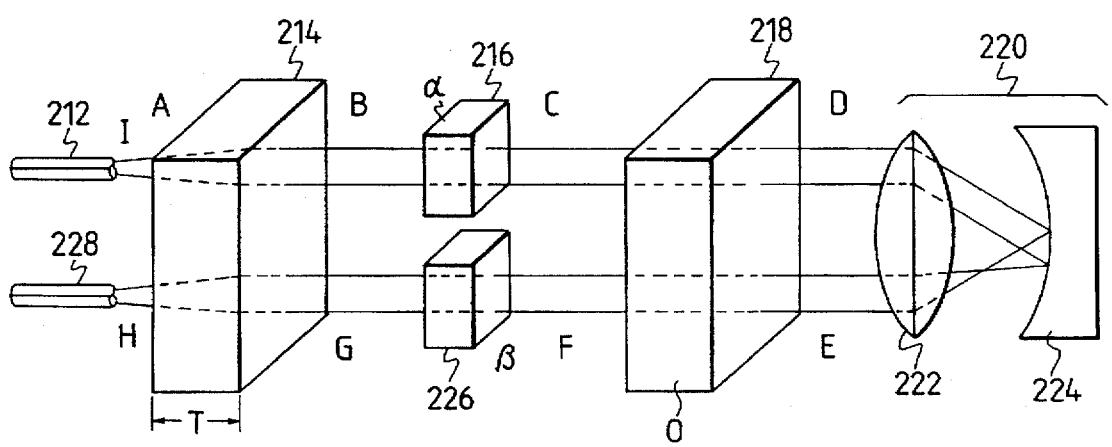
FIG. 9 is perspective view of a prior art polarization independent optical isolator.

In the first and second embodiments, Grin rodlenses 6, 9, 13, and 29 are used. However, spherical lenses or aspherical lenses having large numerical apertures can be used. In this case, aberrations at positions deviated from the center axis of the spherical lens or the aspherical lens should be compensated. Moreover, the grin rod lenses 6, 9, 13, and 29 or spherical lens, that is, any lens can be omitted from the optical isolators of the first and second embodiments as similar to the prior art shown in FIG. 9.

In the first and second embodiment, a description about the space between respective optical elements is omitted. The space may be the air or be filled with other transparent material, such as refractive index matching material. Further, at interface surfaces of respective optical elements, anti-reflection coatings may be formed to reduce unnecessary reflection in the optical isolator.

The modifications of the first embodiment shown in FIG. 5A and 5B are also applicable to the second embodiment. Further, the modification of the second embodiment shown in FIG. 8 is also applicable to the first embodiment.

What is claimed is:

1. A polarization independent optical isolator comprising:
   (a) a first birefringent plate for separating a signal ray passing therethrough into first and second rays wherein the first ray has a polarization that is orthogonal to a polarization of the second ray, wherein said second ray experiences a first spatial displacement as it passes through said first birefringent plate in a first transmitting direction;
   (b) non-reciprocal rotating means for rotating said first and second rays about $\pi/4+n\pi/2$ in a first rotational direction of said first transmitting direction, wherein n is an integer
   (c) a second birefringent plate for combining said rotated first and second rays from said non-reciprocal rotating means to produce a combined ray wherein the rotated first ray experiences a second spatial displacement as it passes through said second birefringent plate in said first transmitting direction, a distance of said first spatial displacement being equal and opposite in direction to a distance of said second spatial displacement;
   (d) reflection means for reflecting said combined ray, said second birefringent plate separating said reflected combined ray passing therethrough into third and fourth rays wherein the third ray has a polarization that is orthogonal to a polarization of the fourth ray, wherein said third ray experiences a third spatial displacement as it passes through said second birefringent plate in a second transmitting direction, said non-reciprocal rotating means rotating said third and fourth rays about $\pi/4+\pi/2$ in a first rotational direction of said second transmitting direction; and
   (e) a third birefringent plate for combining said rotated third and fourth rays from said non-reciprocal rotating means to produce a combined output ray wherein the rotated third ray experiences a fourth spatial displacement as it passes through said third birefringent plate in said second transmitting direction, a distance of said fourth spatial displacement being equal and in a same direction to that of said third spatial displacement;
   wherein said first birefringent plate is adjacent to said third birefringent plate.

2. A polarization independent optical isolator as claimed in claim 1, further comprising:
   a first lens provided between said first birefringent plate and said non-reciprocal rotating means for focusing said first and second rays and for collimating said third and fourth rays.

3. A polarization independent optical isolator as claimed in claim 2, further comprising:
   a second lens provided between said non-reciprocal rotating means and said second birefringent plate for collimating said first and second rays and for focusing said third and fourth rays.

4. A polarization independent optical isolator as claimed in claim 3, further comprising:
   an optical fiber holder for holding a first optical fiber for emitting said signal ray to direct said signal ray toward said first birefringent plate with a predetermine incident angle and for holding a second optical fiber to receive said combined output ray, said optical fiber holder holding said first and second optical fibers such that said first and second optical fibers arranged in parallel with a predetermined interval.

5. A polarization independent optical isolator as claimed in claim 4, wherein said predetermined interval is larger than said first spatial displacement.

6. A polarization independent optical isolator as claimed in claim 4, further comprising:
   said first optical fiber for emitting and directing said signal toward said first birefringent plate; and
   said second optical fiber for receiving said combined output ray.

7. A polarization independent optical isolator as claimed in claim 6, wherein said first and second lenses comprise first and second Grin rodlenses having larger numerical apertures than said first and second optical fibers respectively.

8. A polarization independent optical isolator as claimed in claim 7, wherein said optical fiber holder is arranged such that said first and second optical fibers are inclined to an optical axis of said polarization independent optical isolator.

9. A polarization independent optical isolator as claimed in claim 7, wherein said optical fiber holder has a surface confronting said first birefringent plate, said surface is a predetermined angle inclined to a normal plane of an optical axis of said polarization independent optical isolator, said first and second optical fibers having first and second facets defined by said surface.

10. A polarization independent optical isolator as claimed in claim 9, wherein said first birefringent plate has first and second parallel surfaces and are slantwise arranged such that said first surface contacting with said surface of said optical fiber holder is arranged to have an inclined angle to said optical axis.

11. A polarization independent optical isolator as claimed in claim 10, wherein said birefringent plate slantwise arranged in a plane including said first and second rays transmitted therethrough.

12. A polarization independent optical isolator as claimed in claim 10, further comprising an acute triangle prism, having first and second surfaces, provided between said first birefringent plate and said first lens with said second surface of said first birefringent plate contacting with said first surface of said acute triangle prism and said second surface of said acute triangle prism contacting with a surface of said first lens.

13. A polarization independent optical isolator as claimed in claim 1, wherein said non-reciprocal rotating means comprises a magnetooptic crystal non-reciprocally rotates said first to fourth rays in response to a magnetic field generated by said magnet.

14. A polarization independent optical isolator as claimed in claim 13, wherein said magnet has a cylindrical shape and arranged around said magnetooptic crystal.

15. A polarization independent optical isolator as claimed in claim 13, wherein an inside of said magnet has a dimension such that said magnet is removable from said polarization independent optical isolator on either side of said first birefringent plate or said reflection means.

16. A polarization independent optical isolator as claimed in claim 1, further comprising a third lens for collimating said combined ray and said reflection means comprises, a reflector for reflecting said collimated combined ray, said third lens focusing said reflected combined ray.

17. A polarization independent optical isolator as claimed in claim 16, wherein said third lens comprises a third Grin rodlens having a larger numerical aperture than said first and second optical fibers.

18. A polarization independent optical isolator as claimed in claim 17, wherein said reflector comprises a dielectric film deposited on one surface of said Grin rodlens.

19. A polarization independent optical isolator as claimed in claim 16, wherein said reflector comprises a half mirror.

20. A polarization independent optical isolator as claimed in claim 19, further comprising a detection means for detection light transmitted through said half mirror.

21. A polarization independent optical isolator as claimed in claim 16, wherein said reflector comprises an optical filter for reflecting a component having a predetermined wavelength in said collimated combined ray and transmitting the remaining portion of said collimated combined ray.

22. A polarization independent optical isolator as claimed in claim 21, further comprising detection means for detecting light transmitted through said optical filter.

23. A polarization independent optical isolator as claimed in claim 21, further comprising an absorbing means for absorbing said remaining portion of said collimated combined ray.

24. A polarization independent optical isolator as claimed in claim 1, further comprising a halfwave plate for reciprocally rotating polarized light planes.

* * * * *